UNITED STATES PATENT OFFICE.

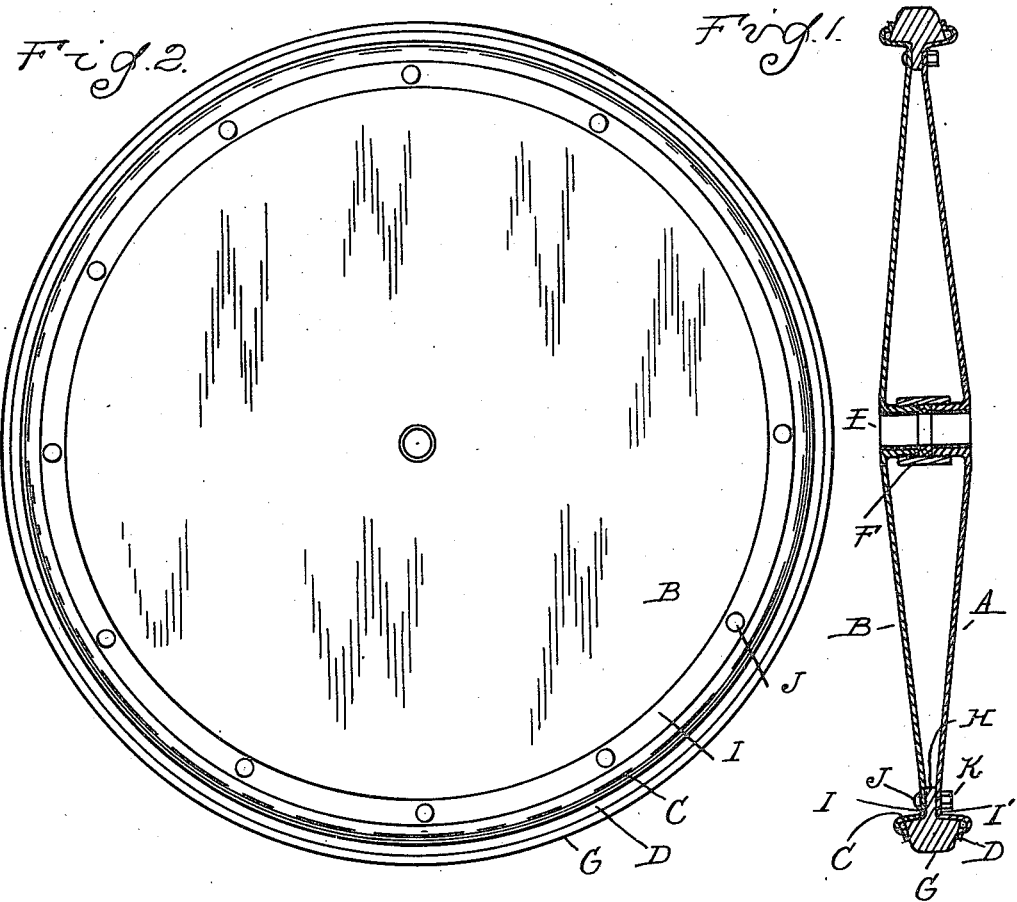

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

WHEEL.

1,193,717. Specification of Letters Patent. Patented Aug. 8, 1916.

Application filed March 31, 1916. Serial No. 87,953.

*To all whom it may concern:*

Be it known that I, ALDEN L. PUTNAM, a citizen of the United States of America, residing at Detroit, in the county of Wayne and State of Michigan, have invented certain new and useful Improvements in Wheels, of which the following is a specification, reference being had therein to the accompanying drawings.

The invention relates to vehicle wheels more particularly designed for use upon small trucks and other vehicles of similar character.

It is the object of the invention to obtain a simple and inexpensive construction of wheel and one in which the tires are easily removed and are securely fastened.

To this end the invention comprises the construction as hereinafter set forth.

In the drawings: Figure 1 is a cross-section through my improved wheel; and Fig. 2 is a side elevation thereof.

A and B are complementary dished disks, which are provided with peripheral laterally-extending flanges C terminating in outwardly-extending flanges D. At the center of each disk is an inwardly-extending hub portion E formed of metal of heavier gage welded or otherwise secured to the disk. These hubs are externally threaded and are coupled to each other by an interiorly, correspondingly-threaded sleeve F. The hubs are also provided with a lining or bushing formed of cast metal, which is welded or completely integrated with the metal of the hub and forms a better wearing surface for the journal.

G is a tire, preferably of solid section, which is clamped between the flanges D of the disks, and also has an inwardly-extending web portion H which is clamped between parallel portions I and I' of said disks. The clamping is effected by bolts J and nuts K, which are distributed around the portions I and I'.

To assemble the wheel, the threaded coupling sleeve F is engaged with one of the hub sections E, and the tire G is also engaged with the flanges C and D of one of the disks. The other disk is then placed in position to engage its hub E with the coupling sleeve F, and by then rotating said disk it will be screwed down until the tire G and web H are firmly clamped. The securing bolts J are then inserted through registering apertures in the disks and the web H and nuts K are tightened. To remove or replace a tire, it is only necessary to detach the bolts and turn one of the disks in relation to the other, so as to unscrew one of the hubs from the coupling sleeve.

What I claim as my invention is:—

1. A wheel, comprising complementary dished disks, each provided with an inwardly-extending threaded hub, a threaded coupling sleeve with which said hubs are engaged by a relative rotation of the disks, and means for normally locking said disks from relative rotation.

2. A vehicle wheel, comprising complementary dished disks having inwardly-extending threaded hubs, a threaded coupling sleeve for engaging said hubs, a tire, and peripheral flanges on said disks forming a seat and securing means for said tire, being adjusted toward each other by a relative rotation of said disks to screw said hubs into engagement with said coupling sleeve.

3. A vehicle wheel, comprising a pair of complementary dished disks, each provided with an inwardly-extending threaded hub and a peripheral flange for seating and clamping the tire, a threaded coupling sleeve for engaging said threaded hubs by a relative rotation of said disks and a series of clamping bolts adjacent to the periphery of said disks for clamping said tire and holding the disks from relative rotation.

4. A vehicle wheel, comprising a pair of complementary dished disks, each provided with an inwardly-extending externally-threaded and interiorly bushed hub, an internally-threaded coupling sleeve for engagement with said hubs by a relative rotation of said disks, and tire-clamping means at the periphery of said disks.

5. In a vehicle wheel, the combination of a pair of complementary dished disks, each provided with an inwardly-extending threaded hub, a laterally-extending peripheral flange terminating in an outwardly-extending flange and having a series of apertures in the portion adjacent to said laterally-extending flange, a threaded coupling sleeve engageable with said hubs by a relative rotation of said disks, a tire seated on said laterally-extending flanges and clamped between said outwardly-extending flanges upon the relative rotation of said disks to screw the hubs into said sleeve, and clamping bolts passing through registering apertures in said disks for holding the same from relative rotation and additionally clamping said tire.

In testimony whereof I affix my signature.

ALDEN L. PUTNAM.